Patented Nov. 8, 1932

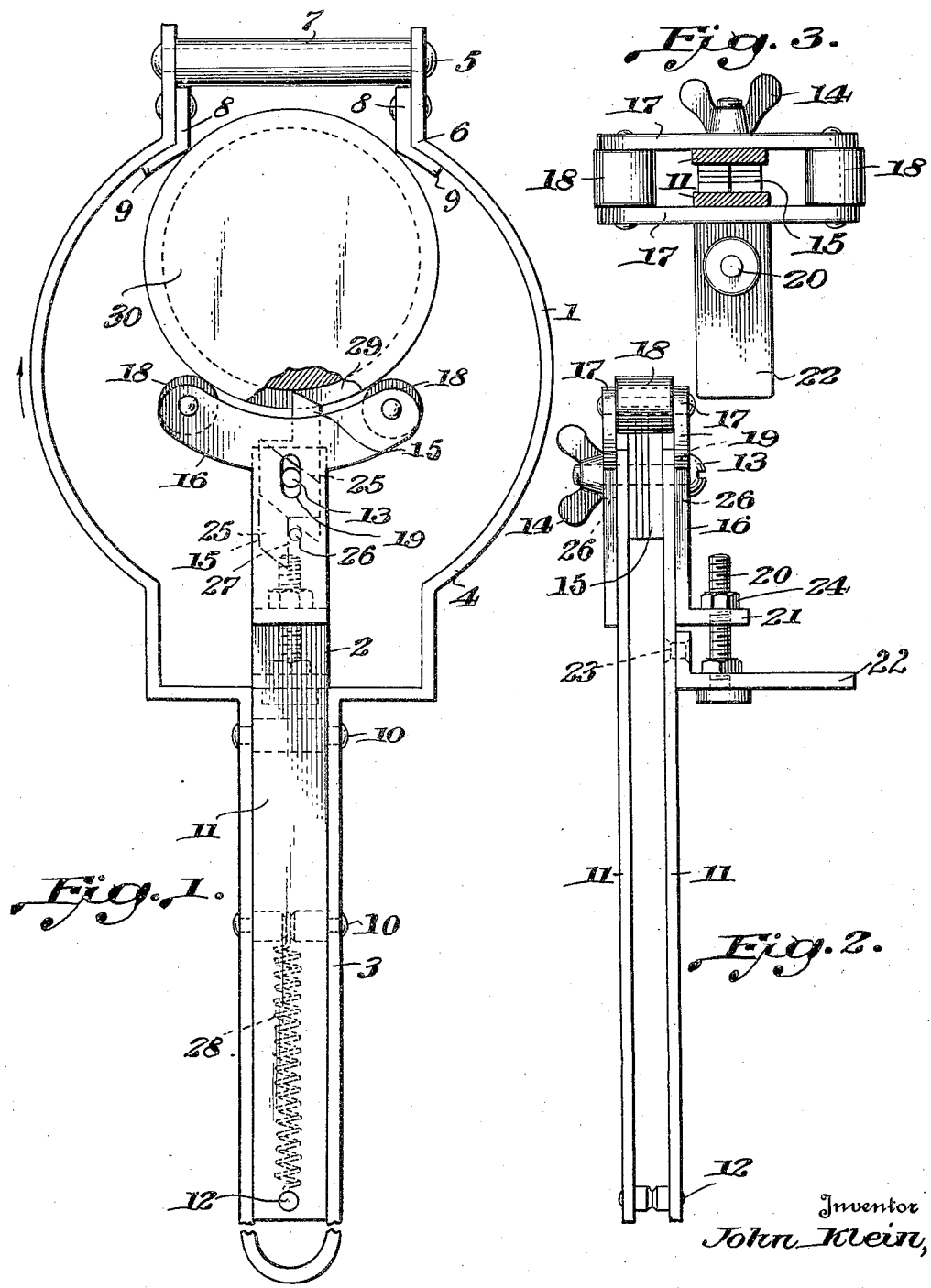

1,886,696

UNITED STATES PATENT OFFICE

JOHN KLEIN, OF CHICAGO, ILLINOIS

PISTON CLEANING TOOL

Application filed September 12, 1929. Serial No. 392,213.

This invention relates to a tool for cleaning the grooves of pistons, particularly of the internal combustion engine type in which piston rings are employed. The invention is an improvement over my Patent No. 1,666,572, granted April 17, 1928.

It is an object of this invention to provide a spring-pressed scraper blade holder which is mounted in an encircling frame and which has adjustable guide rollers.

It is a further object of the invention to provide a plurality of scraper blades which can be adjusted into and out of position to fit any specific size of groove.

Further objects will be apparent from the following specification, taken in connection with the accompanying drawing, in which:

Figure 1 is a side view of the cleaning tool shown in position on a piston.

Fig. 2 is a side view of the scraper blade holder, and

Fig. 3 is a bottom view of the scraper blade holder.

The tool comprises two main parts, one of which is the encircling frame member 1 and the other the scraper blade holder 2. The encircling member 1 is approximately U-shaped and has a handle portion 3 at the lower end and an enlarged circular portion 4 at the upper end, the encircling portion being provided with two short straight projections 6 secured together, but spaced from each other by means of rivet 5 and spacing rod 7. Angle members 8 are riveted to the straight projections and are provided with a curved portion 9, which approximately corresponds to the curvature of the portion 4 and against which the piston is adapted to contact in the cleaning operation. The handle portion is provided with a number of spacing rods 10, preferably two, which are secured therein and which form spacing members and, at the same time, means on which the scraper blade holder slides, the scraper blade holder being composed of two flat bars 11 arranged parallel to each other and secured together in spaced relation at the lower end by means of a rivet 12. The upper ends of the bars are provided with a perforation in which a bolt 13 is provided having a winged nut 14 at one end. Between the bars and on the bolt is secured a plurality of scraper blades 15 which are made of any suitable widths so that by proper adjustment a blade can be made of any desired width to fit the specific widths of the piston grooves to be cleaned. As clearly seen in Fig. 1, the blades, which are not in use, are rotated 180° and are adjusted back into and between the bars 11 as shown in the dotted line position.

In order to guide the scraper blades in the grooves, a guide member 16 is provided on the blade or upper end of the blade holder and this construction comprises a pair of T-shaped members 17, the top portions of which are slightly curved and have a roller 18 rotatably mounted on each end thereof which is adapted to contact with the side of the piston. These T-shaped members are each provided with an elongated slot 19 through which the bolt 13 passes and on which these members are mounted on the outside of the bars 11, as clearly shown in Fig. 2. In order to show the elongated slot 19, the winged nut has been omitted from the bolt 18 in Fig. 1. The object of this slot is to provide for longitudinal adjustment so that the rollers can accommodate any specific diameter of piston and depth of piston groove in cooperation with the scraper blade or blades.

The guide member 16 is adjusted by means of an adjusting screw 20 which is screw-threaded in the angular projection 21 on the lower end of one of the T-shaped members 17, the screw 20 being secured in a handle member 22 which is riveted to the side of one of the bars 11 by means of rivet 23. This member 22 not only acts as a means for securing the adjusting bolt but also as a handle for the scraper blade holder by means of which the holder is moved longitudinally in the handle portion. The lock nut 24 on the screw 20 serves to lock the guide member in adjusted position.

As clearly shown in Fig. 1, each blade is provided at the base end with an angular surface 25 adapted to abut against a pin 26 which is provided in the bars 11. When a blade is adjusted in position to scrape and clean a piston groove this surface abuts against the pin and acts as a stop for the blade; also, when the blade is adjusted out of the cleaning position it likewise forms an abutment for the shank 27 thereof. This pin 26 aids in keeping the blades in adjusted position, but the actual adjustment is accomplished by means of the bolt 13 and winged nut 14.

In order to urge the scraper blade holder upwardly at all times, a spring 28 is provided in the handle portion 3 and between the bars 11, one end being secured on the rivet 12 and the other end on the rivet 10.

In operating the tool, the following steps must be carried out:

First, the exact size of the piston groove is determined and the corresponding size or sizes of blades are adjusted in position, the others being rotated into and between the bars 11. The tool is placed over the piston and the handle 22 is slowly released in order to permit the tool to enter the groove 29 of the piston 30. If the cutting edge of the blade does not contact with the bottom of the groove the guide member is adjusted accordingly, that is, moved back, and after all the parts are adjusted, the winged nut 14 is tightened. The tool can then be rotated around the piston in the direction of the arrow and the rollers 18 contacting on the side of the piston will keep the blade in proper position.

I claim as my invention:—

1. A piston cleaning tool comprising a frame; a holder slidably mounted in said frame; a scraper blade mounted in said holder; and a guide member mounted on the holder and adjacent the blade adapted to cooperate with the blade for the scraping action, said guide member comprising a pair of T-shaped members having a roller mounted in each end of the upper part adapted to contact against the side of the piston.

2. A piston cleaning tool comprising a frame; a holder slidably mounted in said frame; a scraper blade mounted in said holder; a guide member mounted on the holder and adjacent the blade adapted to cooperate with the blade for the scraping action, said guide member comprising a pair of T-shaped members having a roller mounted in each end of the upper part adapted to contact against the side of the piston; and means for adjusting the guide member relative to the blade.

3. A piston cleaning tool comprising a frame; a holder slidably mounted in said frame and composed of a pair of spaced bars; a bolt mounted in one end of said bars; a plurality of blades mounted on the bolt and between the bars; and a guide member mounted on the bolt on the outside of the bars comprising a pair of T-shaped members having a roller mounted in each end of the upper part adapted to contact against the side of the piston.

4. A piston cleaning tool comprising a frame; a holder slidably mounted in said frame and composed of a pair of spaced bars; a bolt mounted in one end of said bars; a plurality of blades mounted on the bolt and between the bars; a guide member mounted on the bolt on the outside of the bars comprising a pair of T-shaped members having a roller mounted in each end of the upper part adapted to contact against the side of the piston; and means for adjusting the guide member relative to the blades.

5. A piston cleaning tool comprising a frame; a holder slidably mounted in said frame and composed of a pair of spaced bars; a bolt mounted in one end of said bars; a plurality of blades mounted on the bolt and between the bars; a guide member mounted on the bolt on the outside of the bars comprising a pair of T-shaped members having a roller mounted in each end of the upper part adapted to contact against the side of the piston; a handle mounted on the holder for sliding the holder in the frame; and means mounted in the handle for adjusting the guide member relative to the blades.

6. A piston cleaning tool comprising a frame; a holder slidably mounted in said frame and composed of a pair of spaced bars; a bolt mounted in one end of said bars; a plurality of blades mounted on the bolt and between the bars; a guide member mounted on the bolt on the outside of the bars comprising a pair of T-shaped members having a roller mounted in each end of the upper part adapted to contact against the side of the piston; and a pin mounted in the bars under the blades and acting as an abutment for the blades.

7. A piston cleaning tool comprising a frame; a holder slidably mounted in said frame and composed of a pair of spaced bars; a bolt mounted in one end of said bars; a plurality of blades mounted on the bolt and between the bars; a guide member mounted on the bolt on the outside of the bars comprising a pair of T-shaped members having a roller mounted in each end of the upper part adapted to contact against the side of the piston; a handle mounted on the holder for sliding the holder in the frame; means mounted in the handle for adjusting the guide member relative to the blades; and a pin mounted in the bars under the blades and acting as an abutment for the blades.

In testimony whereof, I affix my signature.

JOHN KLEIN.